(12) United States Patent
Caruso et al.

(10) Patent No.: US 6,453,224 B1
(45) Date of Patent: Sep. 17, 2002

(54) VEHICLE SATELLITE SENSOR FOR FRONTAL OR SIDE OCCUPANT RESTRAINT DEPLOYMENT

(75) Inventors: Christopher Michael Caruso, Kokomo, IN (US); Brian Scott Kvapil, Janesville, WI (US); Shyam V. Potti, Carmel; Lee Charles Boger, Noblesville, both of IN (US); James Hill Brogoitti, Oro (MX); Hector Daniel Martinez, Oro (MX)

(73) Assignee: Delphi Technologies, Inc., Troy, MI (US)

( * ) Notice: Subject to any disclaimer, the term of this patent is extended or adjusted under 35 U.S.C. 154(b) by 5 days.

(21) Appl. No.: 09/690,104

(22) Filed: Oct. 16, 2000

(51) Int. Cl.$^7$ ............................................... B60R 21/32
(52) U.S. Cl. .......................... 701/45; 701/46; 280/735; 180/282
(58) Field of Search ...................... 701/45, 46; 280/734, 280/735; 180/274, 282; 307/10.1

(56) References Cited

U.S. PATENT DOCUMENTS 5,363,302 A * 11/1994 Allen et al. ................. 280/735
5,483,449 A * 1/1996 Caruso et al. ................ 701/46
5,610,817 A * 3/1997 Mahon et al. ................ 701/46
5,749,059 A * 5/1998 Walton ........................ 701/45
5,899,948 A * 5/1999 Raphael et al. ............. 701/46
5,900,807 A * 5/1999 Moriyama et al. ........... 701/46
5,916,289 A * 6/1999 Fayyad et al. ................ 701/45
5,935,182 A * 8/1999 Foo et al. .................... 180/282
6,128,562 A * 10/2000 Gering ........................ 701/46
6,167,335 A * 12/2000 Ide et al. ..................... 701/46
6,243,633 B1 * 6/2001 Kanameda et al. .......... 701/46

* cited by examiner

*Primary Examiner*—Gary Chin
(74) *Attorney, Agent, or Firm*—Robert M. Sigler

(57) ABSTRACT

A vehicle satellite crash sensor includes a microcomputer with a stored datum indicating intended use in a frontal application such as the front crush space or a side application such as a vehicle side door. The microcomputer also stores a program that processes a sensed acceleration signal, derives an oscillation value and derives an occupant restraint deployment signal at least in response to the oscillation value. The program includes stored code for two alternative oscillation derivation algorithms: one of which is used in frontal applications and derives an integral of the absolute value of the sensed acceleration signal; the other of which is used in side applications and derives an integral of the sensed acceleration. The stored datum determines which of the stored oscillation algorithms is used.

7 Claims, 2 Drawing Sheets

VEHICLE SATELLITE SENSOR FOR FRONTAL OR SIDE OCCUPANT RESTRAINT DEPLOYMENT

TECHNICAL FIELD

The technical field of this invention is the deployment of an occupant restraint in a motor vehicle during a vehicle crash event.

BACKGROUND OF THE INVENTION

Occupant restraint deployment systems have generally relied on a crash sensing and discrimination apparatus in a passenger area of the vehicle, with the addition, in some cases, of satellite sensors in outboard areas of the vehicle such as the frontal crush space and/or vehicle side doors. The satellite sensors have tended to be electromechanical acceleration or velocity responsive switches. The satellite sensors were designed for the specific application, with little flexibility in design or function. Generally speaking, such satellite sensors designed for one location or function were not usable in a different location or function. But recent developments in the field of occupant restraint deployment for motor vehicles call for an advance in the capabilities of "smart" satellite sensors, in which signal processing for crash severity discrimination is provided in satellite sensors in the frontal crush space for discrimination of frontal restraint deployment and/or in a vehicle side door for discrimination of side restraint deployment. With the multiplicity of installed sensors, it is desirable to provide a smart satellite sensor that can be used in a variety of vehicle locations and/or functions with minimal change.

An oscillation measure was developed to address front impact specific criteria. This frontal oscillation measure, described in U.S. Pat. No. 5,483,449, issued Jan. 9, 1996 to Caruso et al, integrates the absolute value of a jerk measure obtained from the derivative of a sensed acceleration signal in a frontal impact sensing area. This oscillation measure has proven effective in helping to distinguish deployment desirable crash events for a frontal restraint, but it has not been equally successful in discriminating such events for a side restraint, since the vehicle side door environment of the satellite sensor is subject to significant accelerations due to door slams and other misuse events in which occupant restraint deployment is not desired.

Another oscillation measure was developed with unique application to side restraint deployment. This side oscillation measure integrates the non-absolute, signed value of the jerk measure obtained from the derivative of a sensed acceleration signal in a side impact sensing area. In this oscillation measure, negative accelerations found frequently in side misuse events are subtracted from, rather than added to, the total side oscillation measure. But the difference in the oscillation measure has meant different satellite sensors for frontal and side impact crash discrimination.

SUMMARY OF THE INVENTION

The object of this invention is to provide a mechanism for discriminating crash severity in a system for controlling the deployment of an occupant restraint that is equally applicable to front and side restraints with minimal change. The object is realized in an apparatus for controlling deployment of an occupant restraint in a motor vehicle crash. The apparatus receives a sensed acceleration signal, derives an oscillation value from consecutive sampled values of the received acceleration signal by a selected one of two alternative methods and derives an occupant restraint deployment signal using the derived oscillation value. The apparatus stores code for both of the methods for deriving the oscillation value and selects the code and method in accordance with the stored datum. Thus the apparatus may be made virtually identically for different sensor applications in a vehicle, such a frontal and side applications, with the stored datum, set during manufacture, determining the actual sensor operation. The apparatus has particular application to alternative frontal and side applications, wherein the use of the first method may be more appropriate for discrimination of frontal crashes and the use of the second method may be more appropriate for discrimination of side crashes.

DESCRIPTION OF THE PREFERRED EMBODIMENT

Figure 1:
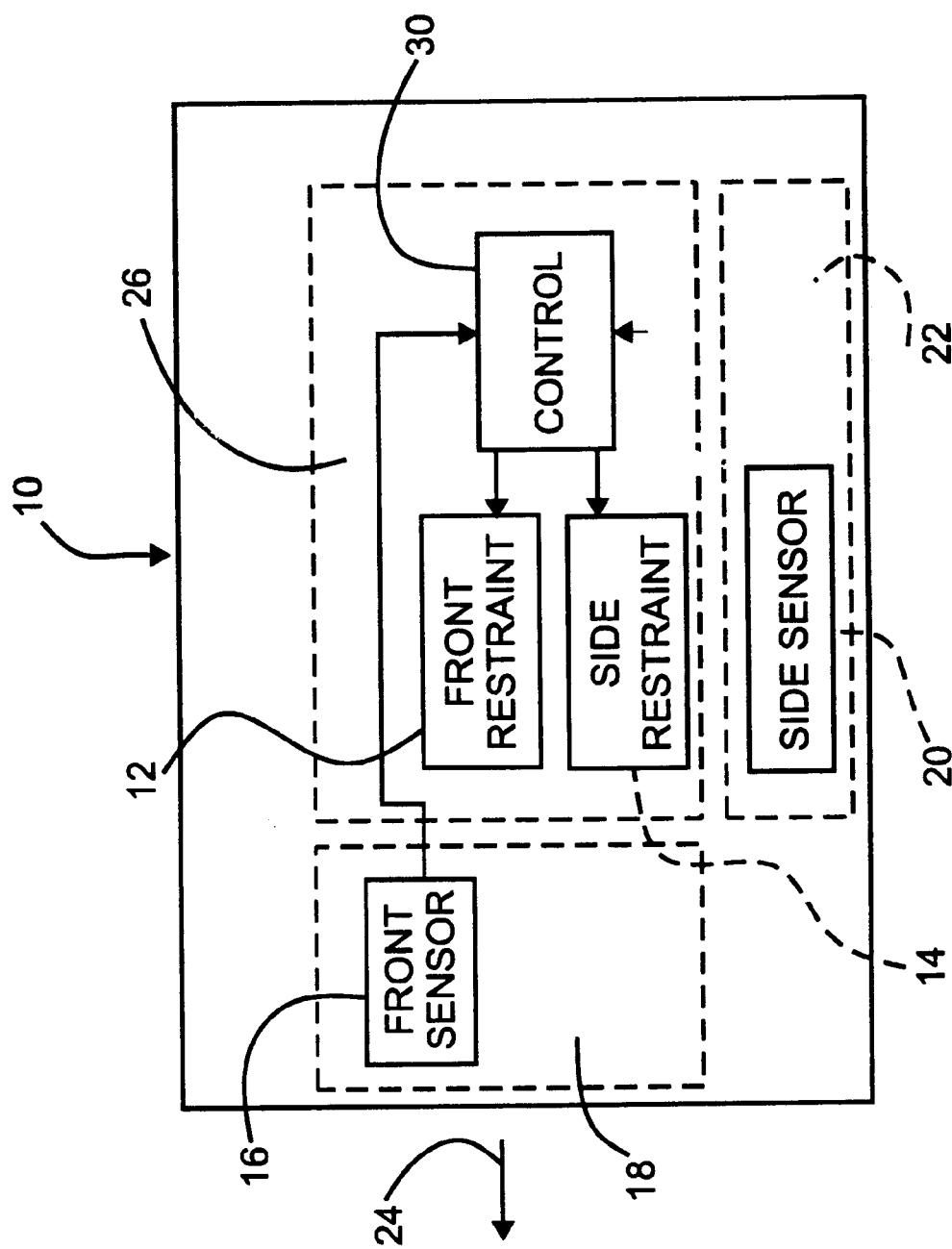
FIG. 1 shows a schematic block diagram of a vehicle occupant restraint and crash sensing discrimination system using satellite sensors provided with selectable oscillation measure processing according to this invention.

Referring to FIG. 1, a vehicle 10 has a front direction indicated by arrow 24. Vehicle 10 is provided with a frontal occupant restraint 12 and a side occupant restraint 14 in appropriate locations to protect a vehicle occupant in front and side crash situations, respectively. A frontal crash satellite sensor 16 is provided in a frontal crash sensing area 18, such as a frontal crush zone; and a side crash satellite sensor 20 is provided in a side crash sensing area 22, such as a vehicle side door. A central restraint deployment control 30 is provided in a passenger area 26 of vehicle 10 to control and coordinate the deployment of restraints 12 and 14 in response to satellite sensors 16 and 20, as well as a passenger area acceleration sensor, not shown, and possibly other sensors detecting occupant presence and/or position, also not shown. Each of satellite sensors 16 and 20 includes an accelerometer for sensing the acceleration of the portion of the vehicle in which it is located and a microcomputer programmed to process the acceleration signal output of the associated accelerometer. The passenger area sensor may be programmed to derive from its accelerometer output a velocity signal and various other metrics that are compared with various stored reference data calibrated for the application in a known manner, as well as logical decision programming to apply received signals from satellite sensors 16 and 20 in the restraint deployment decision process.

Figure 2:
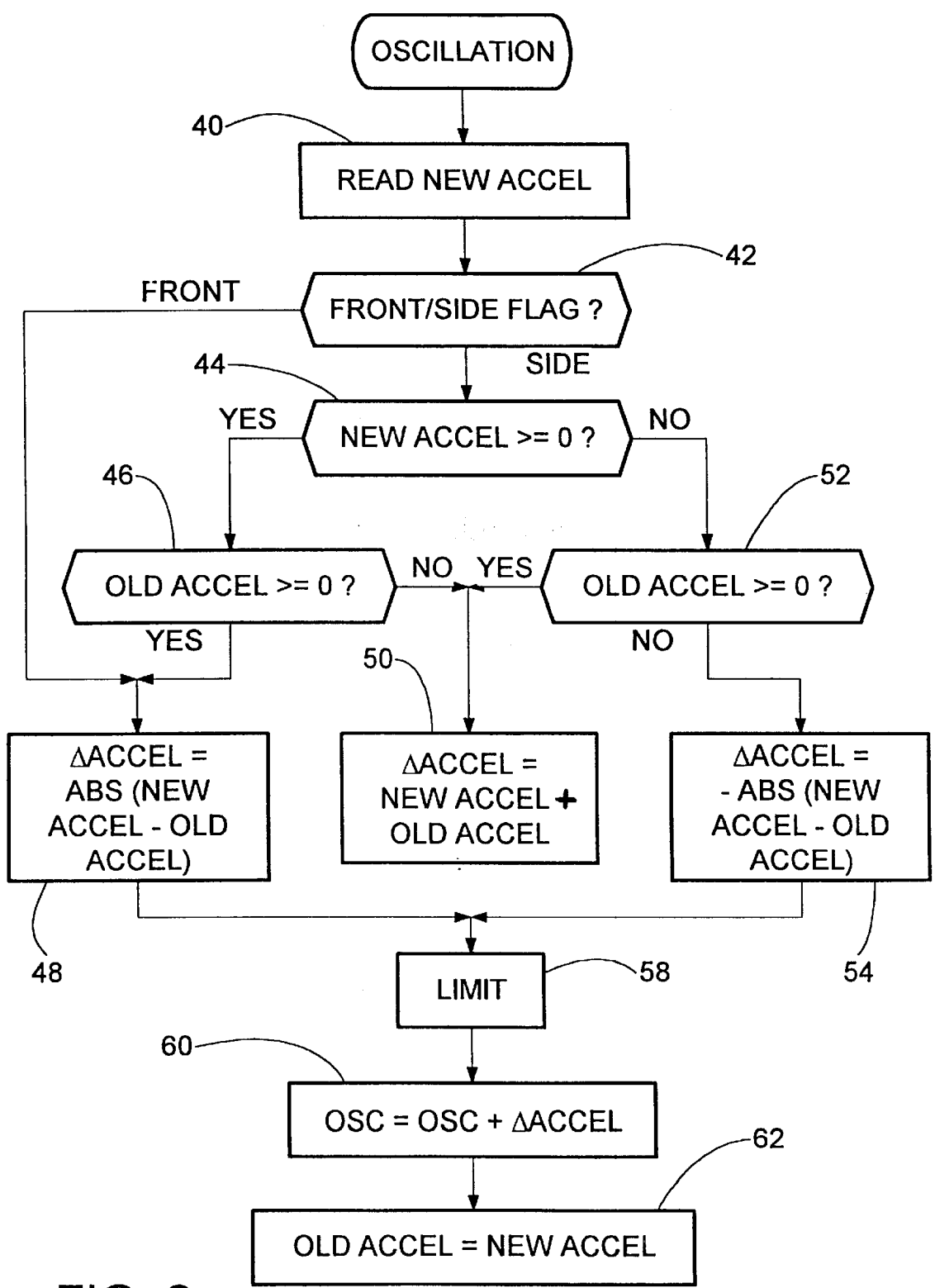
FIG. 2 shows a flow chart of a program for use in the satellite sensors of the system of FIG. 1.

Satellite sensors 16 and 20 are "smart" sensors that include crash discrimination programming. These sensors are each designed particularly for their application, that is, their location in the vehicle and purpose in the total occupant restraint deployment strategy. But this invention allows each of sensors 16 and 20 to include almost identical programming, with specialized portions of the programming for deriving an oscillation measure selected on the basis of a stored, calibratable datum or data, The fill crash discrimination program for each of these sensors may be any suitable program including such an oscillation measure, for example that shown in FIG. 2 of the aforementioned U.S. Pat. No. 5,483,449, which determines a crash event in response to an acceleration measure, an energy measure and an oscillation measure, all derived from a sensed acceleration signal. This invention is concerned with the derivation of the oscillation measure and comparison of the oscillation measure with a stored reference, which steps are indicated in FIG. 2 of the aforementioned U.S. Pat. No. 5,483,449 by reference numerals 20, 22 and 24.

A program according to this invention that replaces step 20 of the aforementioned U.S. Pat. No. 5,483,449 is shown in FIG. 3. This program includes code, indicated by the steps of the flow chart and permanently stored in ROM or other non-volatile memory, which includes a first section applicable to the derivation of a value of oscillation appropriate for frontal applications and a second section applicable to the derivation of another value of oscillation appropriate for side applications. The code provides a digital implementation of a measure of jerk, as represented in the loop-to-loop change in the sampled, sensed acceleration, and an integration of the jerk measure, in the form of a loop-to-loop accumulation of the measure of jerk. The section of code appropriate for frontal applications provides a measure of jerk which is the absolute value of the change in acceleration; while the section of code appropriate for side applications provides a measure of jerk which is the appropriately signed value (not the absolute value) of the change in acceleration. Both sections of code are physically present in memory in the sensor; but only one is chosen during the running of the program, in response to a permanently stored FRONT/SIDE flag.

Program OSCILLATION begins with step 40, in which a new value NEW ACCEL of the sampled, filtered acceleration signal is read. In step 42, a FRONT/SIDE flag is read, to determine which branch of the oscillation determining algorithm will be followed. This flag is permanently set in the microcomputer memory in manufacture, according to whether this sensor is to be a front crash discriminating sensor or a side crash discriminating sensor. It is part of the calibration data which represents the only difference between sensors designed for frontal and side applications. Next, in step 44, it is determined whether the sign of NEW ACCEL is positive or zero. If it is, at step 46 it is determined if the sign of OLD ACCEL, which is the stored, previously read value of the sampled, filtered acceleration signal, is also positive or zero. If so, the change in acceleration $\Delta$ACCEL, which is also the jerk, is determined at step 48 as the absolute value (magnitude) of the difference between the new and old acceleration values:

$$\Delta\text{ACCEL}=\text{ABS(NEW ACCEL}-\text{OLD ACCEL)}.$$

If step 46 finds the sign of OLD ACCEL to be negative (with NEW ACCEL positive or zero), the change in acceleration is determined in step 50 as the sum of the old and new acceleration values:

$$\Delta\text{ACCEL}=\text{NEW ACCEL}+\text{OLD ACCEL}.$$

Returning to step 44, if the sign of NEW ACCEL is negative, it is determined at step 52 if OLD ACCEL is positive or zero. If it is, the change in acceleration is determined at step 50 as the sum of the old and new acceleration values:

$$\Delta\text{ACCEL}=\text{NEW ACCEL}+\text{OLD ACCEL}.$$

If the sign of OLD ACCEL is found at step 52 to be negative (with NEW.ACCEL also negative), the change in acceleration is found in step 54 as the negative of the absolute value (magnitude) of the difference between the old and new acceleration values:

$$\Delta\text{ACCEL}=-\text{ABS(NEW ACCEL}-\text{OLD ACCEL)}.$$

Returning to step 42, if the FRONT/SIDE flag indicates frontal use, the change in acceleration is determined in step 48 as the absolute value (magnitude) of the difference between the new and old acceleration values, regardless of the signs of OLD ACCEL and NEW ACCEL:

$$\Delta\text{ACCEL}=\text{ABS(NEW ACCEL}-\text{OLD ACCEL)}.$$

Following the determination of the change in acceleration (jerk) in any of steps 48, 50 or 54, the value is limited to a calibrated upper limit value or set to zero if less than a lower calibrated limit value in step 58. In step 60, the new oscillation value OSC is accumulated:

$$\text{OSC}=\text{OSC}+\Delta\text{ACCEL}.$$

In step 62, NEW ACCEL replaces OLD ACCEL to set up the next loop.

The other difference between the oscillation determination of this invention and that of the aforementioned U.S. Pat. No. 5,483,449 is that, in the method and apparatus of this invention, different calibrated oscillation reference values such as thresholds may be stored in memory for frontal and side applications; and the appropriate values may be chosen at any required point in the program, such as, for example, in steps 22 and 24 of the aforementioned '449 patent, on the basis of the FRONT/SIDE flag.

The FRONT/SIDE flag, in its simplest embodiment, may be a single bit in a status byte, but is permanently fixed in ROM, EEPROM or other non-volatile memory. The use of two bits, with only one set to 1 for frontal applications and only the other set to 1 for side applications would accomplish the same purpose, with the capability for error checking, at the price of an additional bit.

It should be apparent that various portions of the system shown herein as the preferred embodiment, such as passenger area crash sensor 28, central restraint deployment control 30, or portions of the satellite sensors 16 or 20 may be changed or even eliminated without affecting this invention. What is required is a section of program code for determining an oscillation measure for a frontal application, a section of program code for determining a different oscillation measure for a side application and a control flag, permanently fixed in the sensor, for choosing one, and only one of the included sections of code.

What is claimed is:

1. Apparatus for controlling deployment of an occupant restraint in a motor vehicle crash, the apparatus comprising:

means for receiving and sampling an acceleration signal;

means for deriving a first oscillation value from consecutive values of the received and sampled acceleration signal in a first predetermined process;

means for deriving a second oscillation value from the consecutive values of the received and sampled acceleration signal in a second predetermined process;

means for activating a predetermined one of the means for deriving a first oscillation value and the means for deriving a second oscillation value on the basis of a reference datum so that a selected one of the first oscillation value and the second oscillation value is derived; and means for deriving an occupant restraint deployment signal from the received and sampled acceleration signal and the selected one of the first oscillation value and the second oscillation value.

2. Apparatus of claim 1 comprising an electronic data storage device storing program code and the reference datum, a first portion of the program code comprising the means for deriving a first oscillation value, a second portion of the program code comprising the means for deriving a second oscillation value, and a third portion of the program code comprising the means for activating one of the means for deriving a first oscillation value and the means for deriving a second oscillation value in the operation of the program code on the basis of the reference datum by selecting operation of a predetermined one of the first and second portions of the program code.

3. Apparatus of claim 2 in which the reference datum is permanently fixed in the electronic data storage device with one of a first value predetermined for use with a frontal crash discriminating sensor and a second value for use with a side crash discriminating sensor.

4. Apparatus of claim 3 in which the first value of the reference datum selects the first portion of the program code for use with a frontal crash discriminating sensor and the second value of the reference datum selects the second portion of the program code for use with a side crash discriminating sensor.

5. The apparatus of claim 1 in which:

the means for deriving a first oscillation value comprises means for calculating a sum of terms in which each term comprises a positively signed magnitude of the difference between two consecutive values of the received and sampled acceleration signal; and the means for deriving a second oscillation value comprises means for calculating a sum of terms in which each term comprises, alternatively:
  (a) a positively signed magnitude of the difference between two consecutive values of the received and sampled acceleration signal when both of the consecutive values are positive,
  (b) a negatively signed magnitude of the difference between two consecutive values of the received and sampled acceleration signal when both of the consecutive values are negative, and
  (c) a signed sum of two consecutive values of the received and sampled acceleration signal when one of the consecutive values is positive and the other of the consecutive values is negative.

6. A vehicle crash sensor for an occupant restraint deployment system comprising:

means for providing a sensed acceleration signal; and a microcomputer having a stored program and a stored datum indicating whether the sensor is intended to discriminate a frontal crash or to discriminate a side crash, the stored program comprising means for receiving the sensed acceleration signal, means for deriving a first oscillation value from consecutively sampled values of the acceleration signal in a first predetermined process, means for deriving a second oscillation value from consecutively sampled values of the acceleration signal in a second predetermined process, means for activating one of the means for deriving a first oscillation value and the means for deriving a second oscillation value to derive a selected one of the first oscillation value and the second oscillation value on the basis of a value of the stored datum, and means for deriving an occupant restraint deployment signal using the selected one of the first oscillation value and the second oscillation value.

7. The vehicle crash sensor of claim 6 in which the stored datum indicates activation of the first means for deriving the first oscillation value if the stored datum indicates that the sensor is intended to discriminate a frontal crash and activation of the second means for deriving the second oscillation value if the stored datum indicates that the sensor is intended to discriminate a side crash.

* * * * *